March 5, 1946.  H. J. BUTLER  2,396,153
BRAKE MECHANISM
Filed May 23, 1944  4 Sheets-Sheet 1
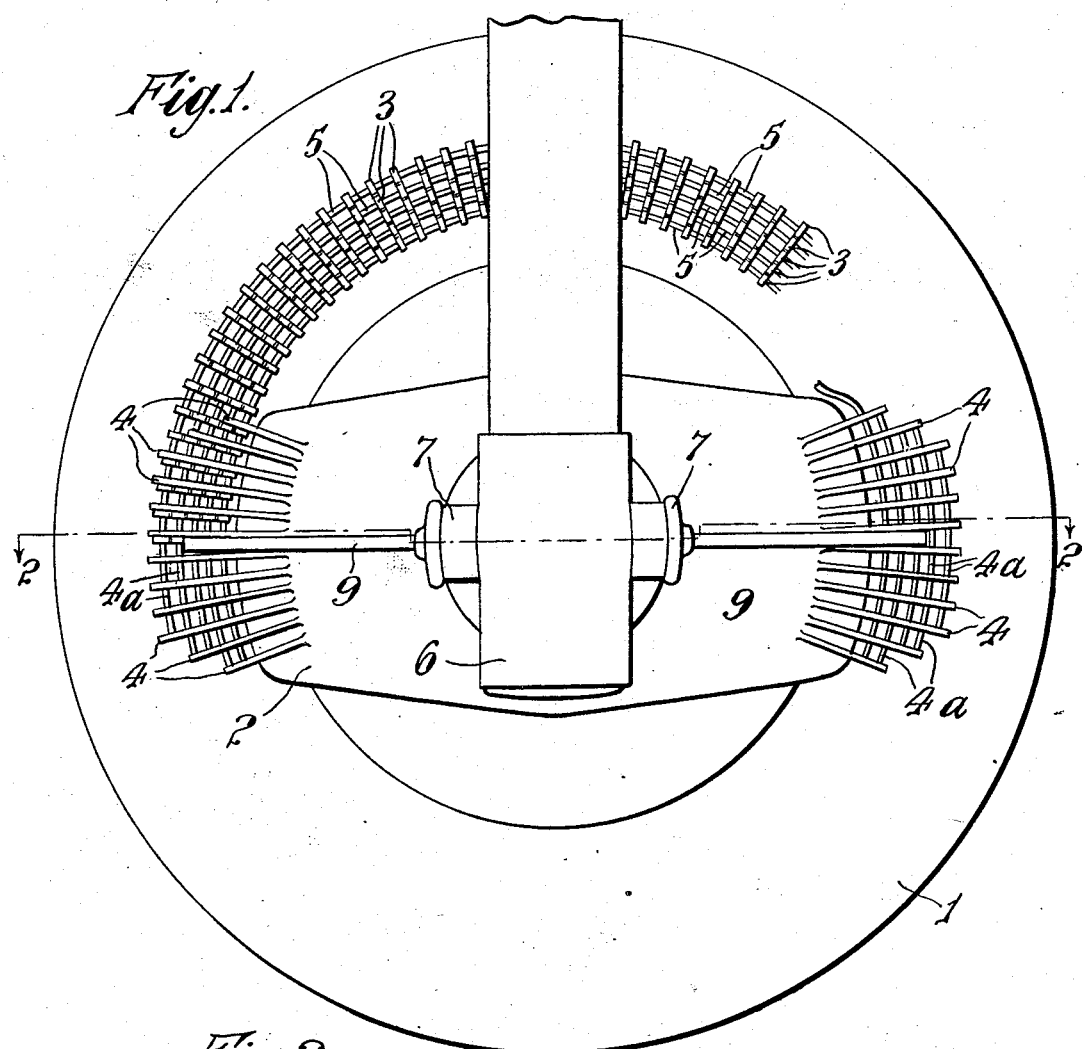
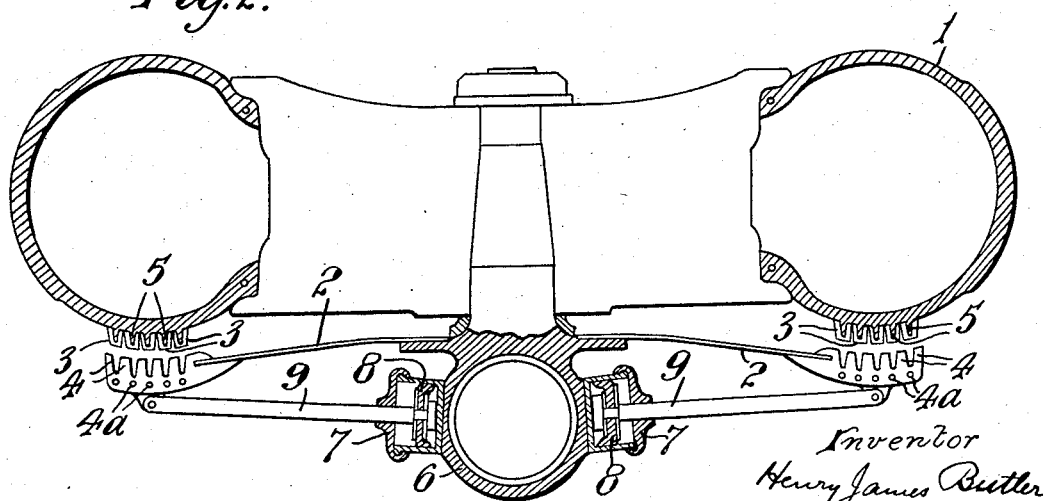
Inventor
Henry James Butler
by Benj. T. Rauber
his attorney March 5, 1946.    H. J. BUTLER    2,396,153
BRAKE MECHANISM
Filed May 23, 1944    4 Sheets-Sheet 2

Inventor
Henry James Butler
by Benj. T. Rauber
his attorney

March 5, 1946. H. J. BUTLER 2,396,153
BRAKE MECHANISM
Filed May 23, 1944 4 Sheets-Sheet 3
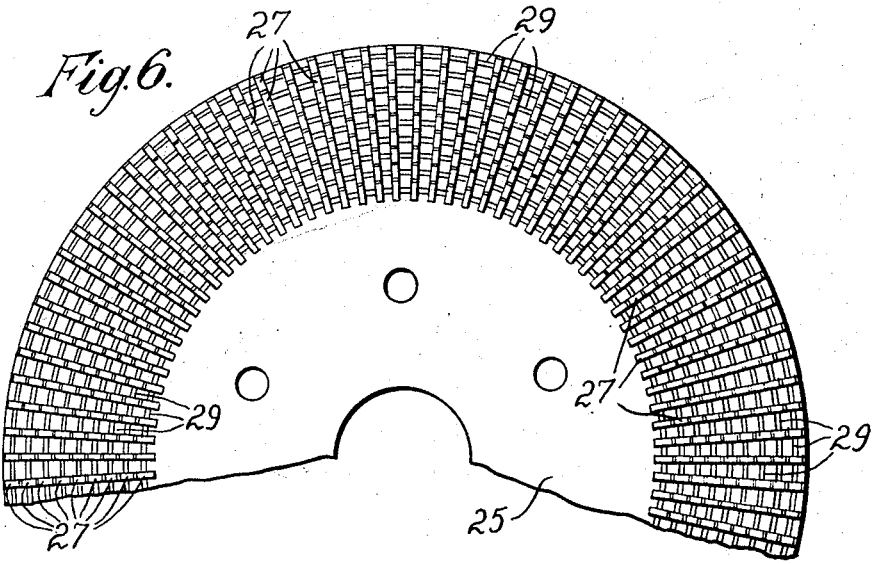
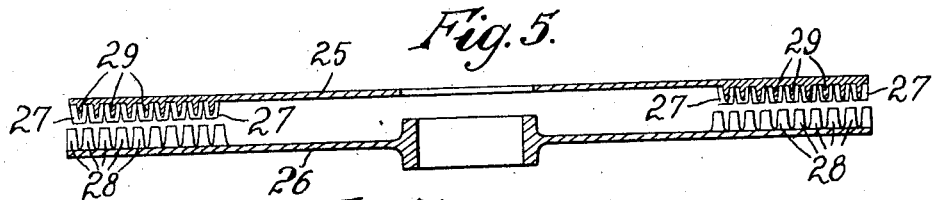
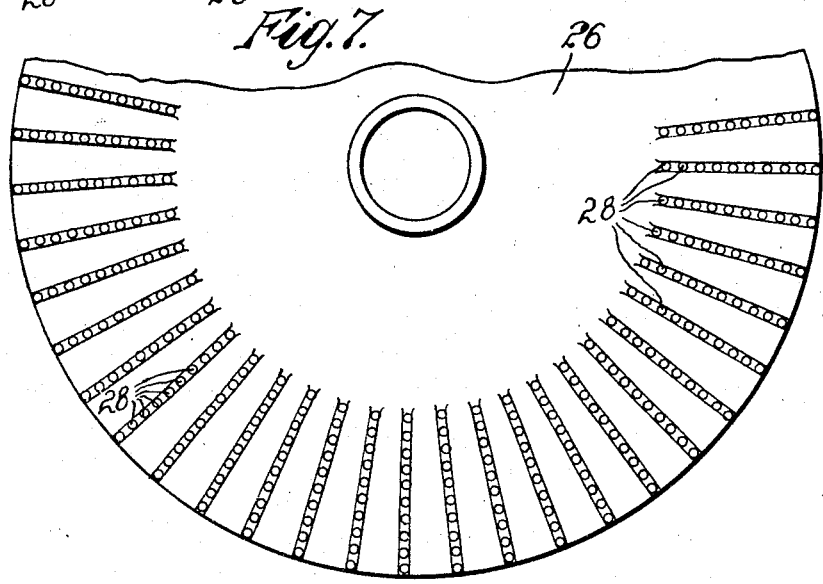
Inventor
Henry James Butler
by Benj. T. Rauber
his attorney March 5, 1946.    H. J. BUTLER    2,396,153
BRAKE MECHANISM
Filed May 23, 1944    4 Sheets-Sheet 4
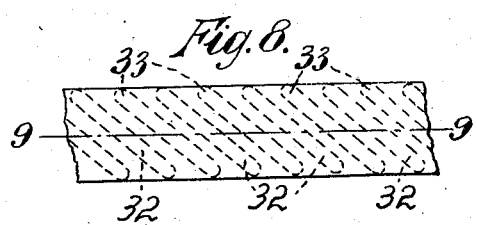
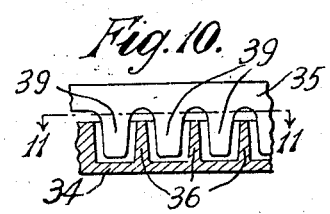
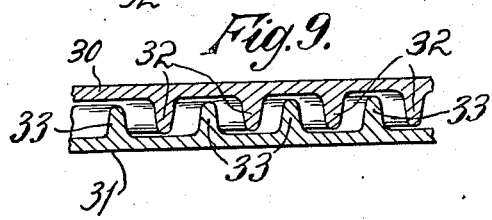
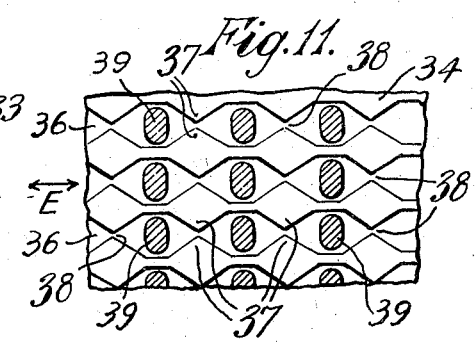
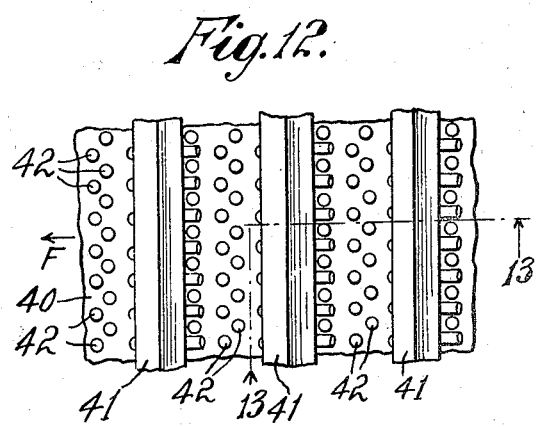
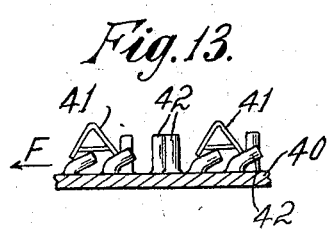
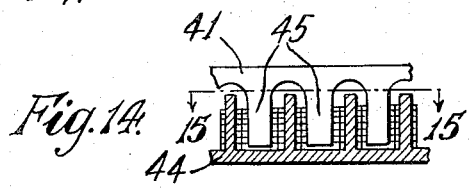
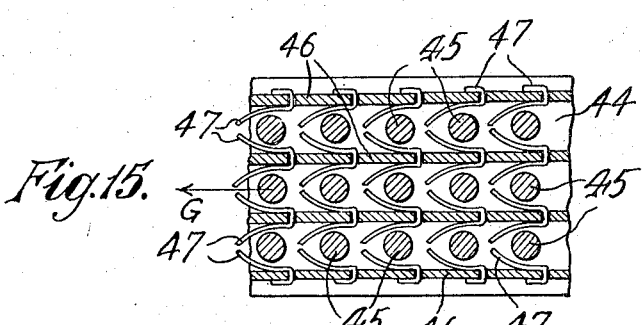
Inventor
Henry James Butler
by Benj. T. Rauber
his Attorney Patented Mar. 5, 1946

2,396,153

UNITED STATES PATENT OFFICE 2,396,153

BRAKE MECHANISM

Henry James Butler, Sutton Coldfield, England, assignor to Dunlop Rubber Company Limited, London, England, a British company Application May 23, 1944, Serial No. 537,012
In Great Britain April 6, 1943

8 Claims. (Cl. 188—102)

My invention relates to improvements in or concerning apparatus for absorbing or transmitting power exemplified hitherto in frictional brake units and clutches of the rotary type.

The invention has for its object to utilise in such apparatus the ability of flexible resilient material to absorb energy imparted thereto by mechanical deformation and to dissipate the energy so absorbed in the form of heat under conditions in which the presence of a lubricant is not disadvantageous.

According to this invention apparatus for absorbing or transmitting power comprises two relatively movable members wherein one member has secured thereto flexible projections of resilient material and the other member has non-yielding projections the said movable members being so located that said resilient and said non-yielding projections are relatively displaceable into and out of a zone of operative contact, and the said projections being so disposed that the non-yielding projections when in the zone of operative contact deform and release successive resilient projections when relative motion takes place.

In order that the invention may be more clearly understood and readily carried into practical effect reference is made, in further describing the same, to the accompanying drawings in which:

Fig. 1 is a side elevation of braking apparatus constructed in accordance with the invention.

Fig. 2 is a part sectional view on the line 2—2 of Fig. 1.

Fig. 5 is a diagrammatic sectional plan view showing an assembly of rotary power transmitting apparatus in accordance with the invention.

Fig. 6 is a part side view of one of the rotary members shown in Fig. 5.

Fig. 7 is a part side view of the other rotary member shown in Fig. 6.

Figs. 8 to 15 are diagrammatic representations of alternative forms of yielding and non-yielding projections for use in accordance with the invention.

Figure 3:
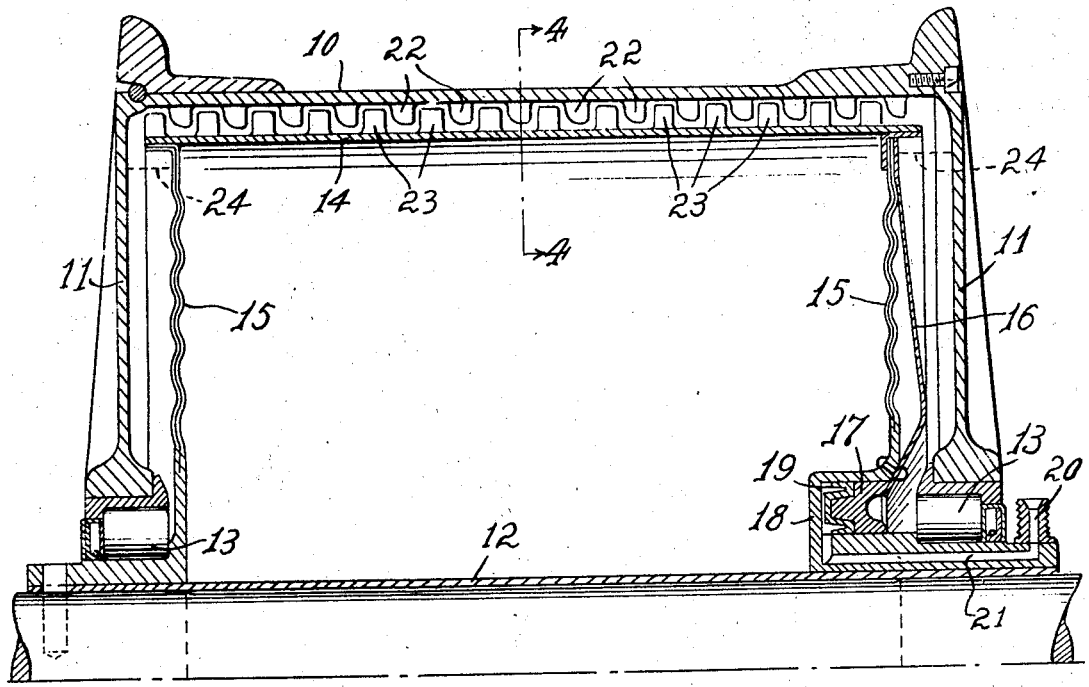
Fig. 3 is a part sectional view of a modified form of braking apparatus constructed in accordance with the invention.

As shown in the accompanying drawings the invention is conveniently embodied in brake or clutch apparatus comprising two relatively rotatable members one member having integral therewith or secured thereto flexible projections of resilient material such as rubber or the like, and the other member having non-yielding projections movable into the path of the flexible and resilient projections.

The members are located for relative displacement on a common axis, for example, by movement of one member towards the other, from an inoperative position in which the respective projections are out of mesh with one another to an operative position in which the resilient and the non-yielding projections enter a mutual zone of operative contact in which the projections secured to the respective members are in mesh with one another over a portion or the whole of their surfaces.

In Figs. 1 and 2 is shown wheel brake apparatus suitable for aircraft landing wheels in which the rotatable member consists of a wheel and pneumatic tyre 1 of which at least one side wall is moulded with radially extending ribs composed of a series of resilient projections of which the individual units 3 project in opposite radial directions at circumferential intervals from a plurality of ribs 5 of resilient material concentric with the rotatable member 1 and extending circumferentially thereof.

As shown in Fig. 1 both the resilient projections 3 and the non-yielding projections 4 are of radially elongated form and disposed on parallel radial axes, the teeth of the non-yielding projections 4 being positioned as shown in Fig. 2 in register with the grooves between the ribs 5 connecting the yielding projections.

As shown in Figs. 1 and 2 the non-yielding projections 4 are radially secured to the diametrically opposite ends of a non-rotatable member 2 in the form of a resilient web or plate which is attached at its centre to an oleo leg or other wheel supporting structure 6. The non-yielding projections 4 may be braced together by ties 4a.

Remotely operable power operated means comprising, for example, a pair of cylinders 7 and pistons 8 are carried by the wheel supporting structure 6, the piston rods 9 being pivotally connected to the non-yielding projections whereby on admitting fluid under pressure to the cylinders the resilient plate 2 is deflected and the non-yielding projections attached thereto carried in a direction parallel to the wheel 1 into mesh with the flexible projections to a depth which may be limited by the travel permitted to the pistons.

The natural resiliency of such plate serves to restore and maintain the normal separation of the non-yielding and flexible projections in the inoperative position shown, and its depth of web is adapted to absorb the torque transmitted thereto when deflected to the operative position.

Figure 4:
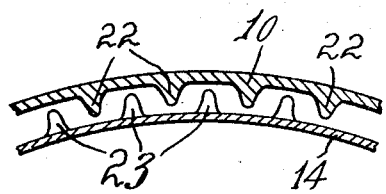
Fig. 4 is a part sectional end view on the line 4—4 of Fig. 3.

In Figs. 3 and 4 the invention is illustrated in its application to a wheel of the type having a tyre mounted directly on a hubshell having internal braking mechanism, the apparatus in this case comprising essentially two cylindrical members one concentrically disposed within the other and movable axially relative to the other. The two cylindrical members consist of an outer member 10 supported and sealed at opposite ends by rigid end-plates 11 rotatably positioned on a wheel supporting shaft or like structure 12 by bearings at 13. The inner cylindrical member 14 is supported and sealed at opposite ends by a pair of resilient end-plates 15 of which the webs are corrugated to impart flexibility thereto and the inner portions centrally secured to the non-rotating axle 12. Between the resilient end-plate 15 and the rigid end-plate 11 at one end of the hubshell is disposed a disc 16 of angular or other rigid section, said disc being connected at its outer periphery to the inner non-rotatable member 14 and at its centre to the external face of a ring 17 displaceable axially of the hubshell in an annular chamber 18, said ring having on its internal face a gasket 19 adapted to expand into sealing contact with the walls of the chamber 18 on the introduction thereto of fluid under pressure through the inlet connection 20 and channel 18. The lesser diameter surface of the outer member 10 is provided at circumferential intervals with axially extending rows of non-yielding projections 22, the adjacent projections in each of such rows being spaced axially apart to permit the passage therebetween of resilient projections 23 similarly spaced apart and secured to the greater diameter surface of the non-rotatable member 14.

Liquid lubricant may be introduced into the intercommunicating spaces formed respectively between the cylindrical members 10 and 14, the rigid and resilient end-plates 11 and 15 at one end of the hubshell, and the rigid end-plate 11 and disc 16 at the opposite end of the hubshell. The lubricant introduced may be sufficient to maintain a level substantially as indicated by dotted lines 24 during rotation of the wheel.

In operation the projections carried by the respective cylindrical members are normally positioned by the resilient end-plates 15 in the inoperative position shown. On introducing fluid under pressure into the chamber 18 the disc 16 is moved axially thus displacing the cylindrical member 14 and carrying the resilient projections 23 secured thereto into operative contact with the non-yielding projections 14 secured to the outer cylindrical member 10.

In Figs. 5 to 7 the invention is shown in its application to rotary power transmission in the form of apparatus comprising a pair of coaxial annular members 25 and 26 one member, for example, the member 25 having secured thereto an annular band of flexible projections 27 of the kind hereinbefore described with reference to Figs. 1 and 2, and the member 26 having at circumferential intervals radial rows of non-yielding projections 28 disposed to register with the grooves between the ribs 29 which connect the flexible projections together. On one of the members 25 or 26 being moved axially towards the other the non-yielding projections 28 deform and release successive projections 26 of resilient material when only partly within the zone of operative contact and relative rotation takes place between the members. When the zone of contact is increased until the projections are fully engaged however, rotary movement may be transmitted from one member to the other without slip due to the additional resistance to deformation in shear provided by the root portions of the resilient projections.

In Figs. 8 to 15 are shown relatively movable members having various forms of flexible and non-yielding projections secured thereto. In Fig. 8 is shown a fragmentary plan view, and in Fig. 9 a sectional view on the line 9—9 of Fig. 8 wherein two members 30 and 31 are movable relative to one another lengthwise of the line 9—9 said members having non-yielding projections 32 and flexible projections 33 secured alternately to their opposed faces at an angle to the line 9—9.

Fig. 10 is a fragmentary sectional view of two relatively movable members 34 and 35, and Fig. 11 is a section on the line 11—11 of Fig. 10. In these two figures a member 34 composed of rubber or like resilient material moulded with continuous ribs 36 having side wall projections 37 Fig. 11 disposed to form narrow gaps 38 at which the resilient material is laterally compressed on movement of the member 34 in the direction of the arrows E relative to the drag applying member 35 carrying non-yielding projections 39.

Fig. 12 is a part plan view of two relatively movable members 40 and 41, and Fig. 13 is a sectional view thereof on the line 13—13 of Fig. 12. In these two figures is shown a member 40 having secured thereto flexible columnar projections 42 of resilient material movable in the direction of the arrow F relative to stationary drag-applying members 41 which may be secured to a common back-plate, not shown.

Fig. 14 is a fragmentary sectional view of two relatively movable members 43 and 44 and Fig. 15 is a section on the line 15—15 of Fig. 14. In these two figures the member 43 is movable in the direction of the arrow G relative to the member 44. The member 43 has secured thereto non-yielding projections 45 and the member 44 is formed with non-yielding ribs 46 recessed at intervals to accommodate resilient elements projecting therefrom in the form of superposed spring 47. The free ends of the springs 47 are bent towards one another to provide a series of resilient projections subjected to deformation and release by each of the non-yielding projections 45 carried by the member 43.

Having described my invention what I claim is:

1. Apparatus for absorbing or transmitting power comprising a pair of relatively rotatable members, one of said members having spaced concentric ribs of resilient material and flexible projections projecting from said ribs into the spaces between said ribs, and the other of said members having non-yielding projections movable in the spaces between said ribs to engage said flexible projections whereby the flexible and the non-yielding projections may be progressively engaged.

2. Apparatus for absorbing and transmitting power which comprises a pair of relatively rotatable members one of said members having concentric ribs of yieldable material and yieldable projections extending sidewise from said ribs and the other of said members having concentric rows of non-yielding projections movable to engage said yieldable projections whereby the flexible and non-yielding projections may be progressively engaged.

3. The apparatus of claim 2 having means to move said non-yielding projections into part contact with said yieldable projections to permit relative rotation and further into complete engagement to eliminate slippage between said members.

4. A wheel and brake which comprises a pneumatic tire having concentric spaced ribs on one side wall and resilient projections from said ribs into the spaces between said ribs, said projections being arranged in rows transversely of said ribs, a braking plate concentrically mounted relative to said wheel and held stationary, said braking plate having rows of non-yielding projections extending toward said ribs and projections of said wheel and fluid operated means to move said projections of said plate progressively into engagement with the projections of said tire.

5. Apparatus for absorbing or transmitting power which comprises relatively rotatable members, one of said members having resilient projections arranged in spaced rows extending along the path of relative rotation between said members, and the other of said members having non-yielding projections arranged in rows between those of said first mentioned member and means to move one of said members relatively to the other to engage the projections of one member with those of the other member progressively.

6. Apparatus for absorbing or transmitting power comprising an outer cylinder having circumferentially spaced rows of projections extending from its inner surface toward the axis of said cylinder, an inner cylinder co-axial with said outer cylinder and having projections extending from its outer surface into the spaces between the rows of said outer cylinder, the projections of at least one of said cylinders being yieldable, one of said cylinders being movable axially relatively to the other to bring their respective projections progressively into and out of engagement.

7. Apparatus for absorbing or transmitting power, comprising a pair of relatively rotatable members, one of said members having spaced rows of spaced resilient projections, said rows each being concentric with the axis of rotation of said members, and the second member having spaced rows of spaced members each row being concentric with the axis of rotation of said members and between said rows of resilient projections of said first member, said members being movable to bring the projections of one member progressively into engagement to cause deformation of said resilient projections the spacing and dimensions of said projections being sufficient to enable the projections of one member to interlock with those of the other in fully engaged position.

8. Apparatus for absorbing power which comprises a pneumatic rubber tyre having spaced concentric ribs extending sidewise from and concentric with a side wall of said tyre and having projections extending from said ribs into spaces between said ribs, said ribs and said extensions being of flexible resilient rubber composition, and a non-rotatable plate spaced axially from said ribs and projections of said tyre wall and having projections extending toward the spaces between the ribs of said tyre wall and movable toward said tyre to engage progressively with the projections from the ribs of said tyre wall.

HENRY JAMES BUTLER.